(12) United States Patent
Xiong

(10) Patent No.: US 7,896,613 B2
(45) Date of Patent: Mar. 1, 2011

(54) SYSTEM AND METHOD FOR WIND TURBINE NOISE CONTROL AND DAMAGE DETECTION

(75) Inventor: Wei Xiong, Sichuan (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/477,437

(22) Filed: Jun. 3, 2009

(65) Prior Publication Data

US 2010/0143117 A1    Jun. 10, 2010

(51) Int. Cl.
*F03D 7/00*    (2006.01)
(52) U.S. Cl. .............................................. 416/1
(58) Field of Classification Search ............... 416/1
See application file for complete search history.

(56) References Cited

U.S. PATENT DOCUMENTS

| | | | |
|---|---|---|---|
| 4,524,620 A * | 6/1985 | Wright et al. .................. 416/61 |
| 6,386,038 B1 | 5/2002 | Lewis, III et al. |
| 6,525,518 B1 * | 2/2003 | Garnaes ......................... 416/35 |
| 7,072,784 B2 | 7/2006 | Wobben |
| 7,075,424 B1 | 7/2006 | Sundaresan et al. |
| 7,080,555 B2 | 7/2006 | Austin et al. |
| 2004/0236538 A1 * | 11/2004 | Wobben ........................ 702/188 |
| 2007/0159346 A1 | 7/2007 | Wesselink |
| 2007/0183885 A1 | 8/2007 | Ormel et al. |
| 2008/0164091 A1 | 7/2008 | Kerber |
| 2008/0206052 A1 * | 8/2008 | Volkmer ........................ 416/61 |

FOREIGN PATENT DOCUMENTS

| | | |
|---|---|---|
| DE | 10065314 A1 | 7/2002 |
| DE | 10065314 B4 | 8/2007 |
| JP | 2001349775 A * | 12/2001 |
| JP | 2007205225 A * | 8/2007 |
| WO | 2008119350 A2 | 10/2008 |
| WO | 2008119350 A3 | 10/2008 |

OTHER PUBLICATIONS

Machine Translation of JP 2001-349775 A. Jul. 21, 2010.*
Machine Translation of JP 2007-205225 A. Jul. 21, 2010.*
JP 2001-349775 A. Machine Translation of Claims 1-4. Accessed JPO website on Nov. 1, 2010.*

* cited by examiner

*Primary Examiner* — Richard Edgar
(74) *Attorney, Agent, or Firm* — James W. Pemrick; Ernest G. Cusick; Frank A. Landgraff

(57) ABSTRACT

A system and method of providing noise control for a wind turbine are provided. The system includes at least one blade operably mounted on a wind turbine, and one or more sensors for receiving one or more signals relating to an operating characteristic of the wind turbine. A controller is configured for evaluating the signals to determine if they are outside a predetermined range. The system is configured to adjust operating characteristics and/or generate alarms if the signals are outside a predetermined range. The method includes the steps of receiving one or more signals from one or more sensors, determining if the signals are outside a predetermined range, and adjusting an operating parameter of the wind turbine or generating an alarm in response to the signals received from the sensors. The operating parameter can be adjusted to alter the amount of noise generated by the wind turbine.

16 Claims, 6 Drawing Sheets

SYSTEM AND METHOD FOR WIND TURBINE NOISE CONTROL AND DAMAGE DETECTION

BACKGROUND OF THE INVENTION

The present invention generally relates to a system and method for noise control and damage detection in a wind turbine. In particular, the present invention relates to a system and method to control the noise generated by the wind turbine or detect damage by sensing acoustical emissions.

Recently, wind turbines have received increased attention as an environmentally safe and a relatively inexpensive alternative energy source. With this growing interest, considerable efforts have been made to develop wind turbines that are reliable and efficient.

Generally, a wind turbine can include a plurality of blades coupled to a generator rotor through a hub. The generator rotor can be mounted within a housing or nacelle, which may be positioned on top of a tubular tower or a base. The hub and blades may form a wind turbine rotor. Utility grade wind turbines (for example, wind turbines designed to provide electrical power to a utility grid) can have large wind turbine rotors (for example, about thirty or more meters in diameter). Blades on these wind turbine rotors can transform wind energy into a rotational torque or force that drives the rotor of one or more generators, rotationally coupled to the rotor. However, the rotation of the blades can produce undesirable noises.

One known method of reducing the noise generated by the wind turbine is to disable or derate the entire system, thereby preventing or reducing the generation of noise. However, disabling or derating the entire system also prevents the system from producing the desired amount of energy. Another known technique to reduce noise in the system is through mechanical modifications to the system. For example, noise-insulating coatings may be applied to the system and any housings encasing such components to reduce noise generated. Alternatively, the system can be manufactured with noise-absorbing or noise attenuating features. However, the use of noise-insulating coatings, noise-absorbing features, and/or noise-attenuating features are expensive and add significant complexity and expense to the system and do not permit reduction of noise in response to changing external conditions. Furthermore, the noise-insulating coatings, noise-absorbing features, and/or noise-attenuating features do not adequately shield from noise generated by the rotation of the blades.

BRIEF DESCRIPTION OF THE INVENTION

In one embodiment of the present invention, a method of noise control is provided for a wind turbine. The method includes the steps of receiving one or more signals from one or more sensors, determining if the signals are outside a predetermined range, and adjusting an operating parameter of the wind turbine in response to the receiving one or more signals step. The operating parameter is adjusted to alter the amount of noise generated by the wind turbine.

In another embodiment of the present invention, a method of detecting damage to a wind turbine is provided. The method includes the steps of receiving one or more signals from one or more sensors, determining if the signals are outside a predetermined range, and generating an alarm in response to the determining step.

In yet another embodiment of the present invention, a wind turbine system for controlling noise or detecting damage is provided. The system includes at least one blade operably mounted on a wind turbine. One or more sensors are attached to the wind turbine, and are configured for receiving one or more signals relating to an operating characteristic of the wind turbine. A controller is configured for evaluating the one or more signals to determine if the signals are outside a predetermined range. The system is configured to adjust an operating characteristic of the wind turbine and/or generate an alarm if the signals are outside the predetermined range.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
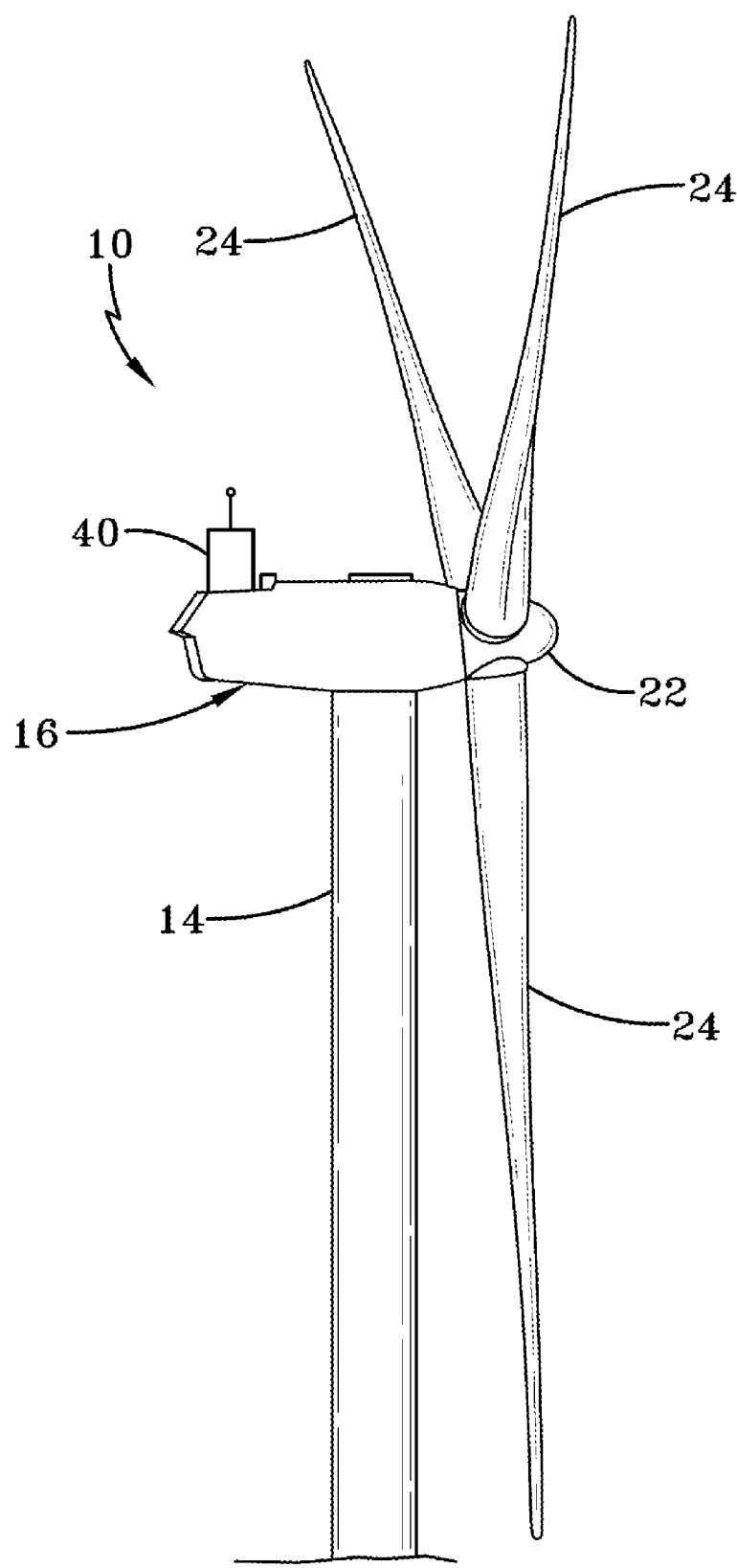
FIG. 1 illustrates a side view of a wind turbine according to an embodiment of the invention.
Figure 2:
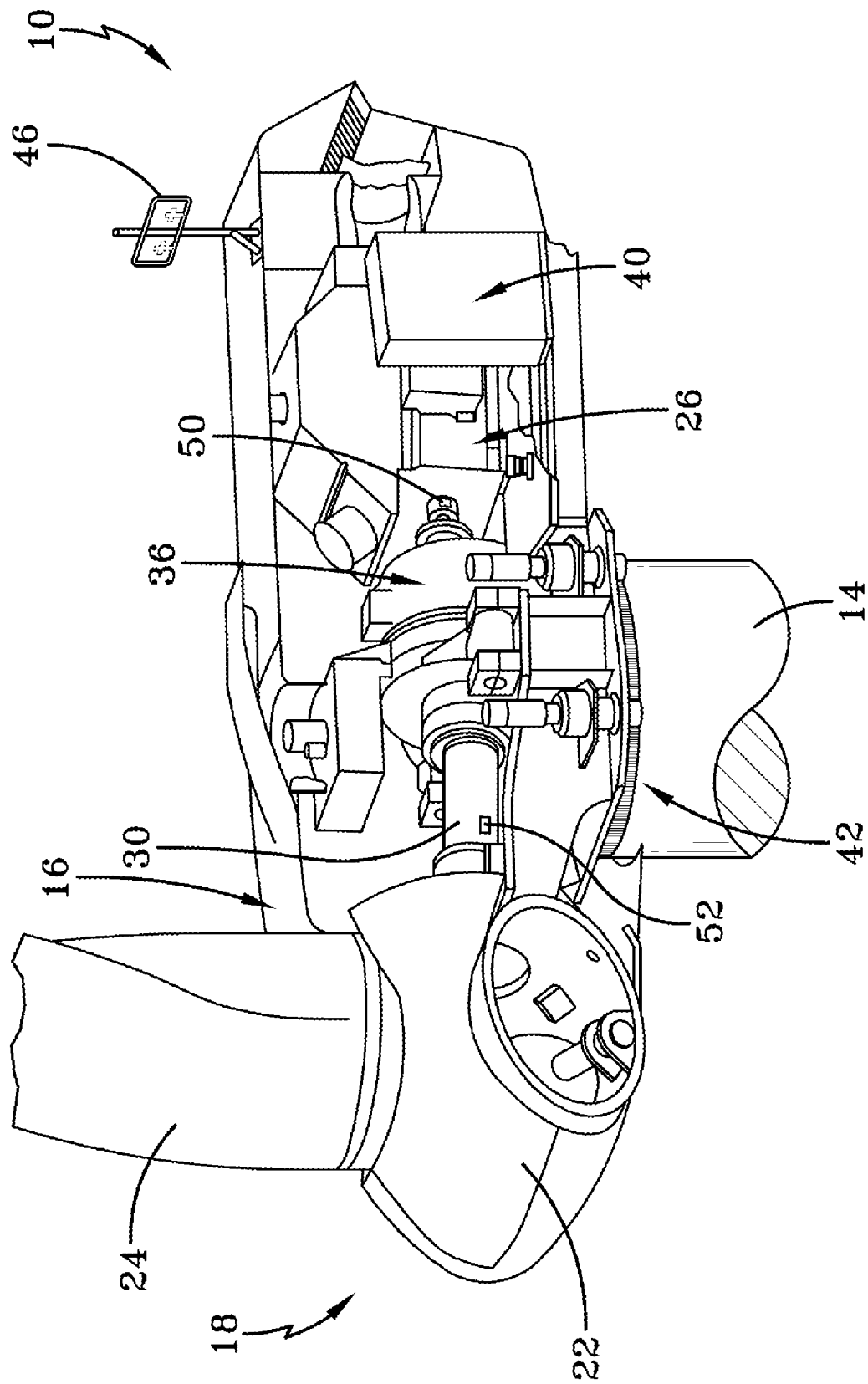
FIG. 2 illustrates a partial cutaway of a portion of a wind turbine according to an embodiment of the invention.

As shown in FIG. 1, a wind turbine system 10 generally comprises a nacelle 16 housing a generator 26 (see FIG. 2). Nacelle 16 can be a housing mounted atop a tower 14. Wind turbine system 10 can be installed on various types of terrain providing access to areas having desirable wind conditions. The terrain may vary greatly and may include, but is not limited to, mountainous terrain or off-shore locations. Wind turbine system 10 can also include one or more rotor blades 24 attached to a rotating hub 22. System 10 can include generator 26 for converting rotation of rotor blades 24 into electrical power.

FIG. 2 shows generator 26 connected to rotor 18 via a gearbox 36 that is in rotational communication with rotating hub 22, about which the one or more rotor blades 24 may rotate. In some embodiments, wind turbine 10 may include a disc brake (not shown) for braking rotation of rotor 18 to, for example, slow rotation of rotor 18, brake rotor 18 against full wind torque, and/or reduce the generation of electrical power from generator 26. Furthermore, in some embodiments, wind turbine 10 may include a yaw system 42 for rotating nacelle 16 about an axis of rotation (not shown) for changing a yaw of rotor 18, and more specifically for changing a direction faced by rotor 18 to, for example, adjust an angle between the direction faced by rotor 18 and a direction of wind. Yaw system 42 may be coupled to a controller 40 for control. In some embodiments, wind turbine 10 may include anemometry 46 for measuring wind speed and/or wind direction. Anemometry 46, in some embodiments, may be coupled to controller 40 for sending measurements to controller 40 for processing thereof. For example, although anemometry 46 may be coupled to controller 40 for sending measurements thereto for controlling other operations of wind turbine 10, anemometry 46 may send measurements to controller 40 for controlling and/or changing a yaw of rotor 18 using yaw system 42. Alternatively, anemometry 46 may be coupled directly to yaw system 42 for controlling and/or changing a yaw of rotor 18. In other embodiments, controller 40 may control one wind turbine 10 or a plurality of wind turbines 10, controller 40 may operate in conjunction with other controllers, controller 40 may be a central controller controlling a plurality of wind turbines 10, and/or controller 40 may additionally operate other systems.

Figure 3:
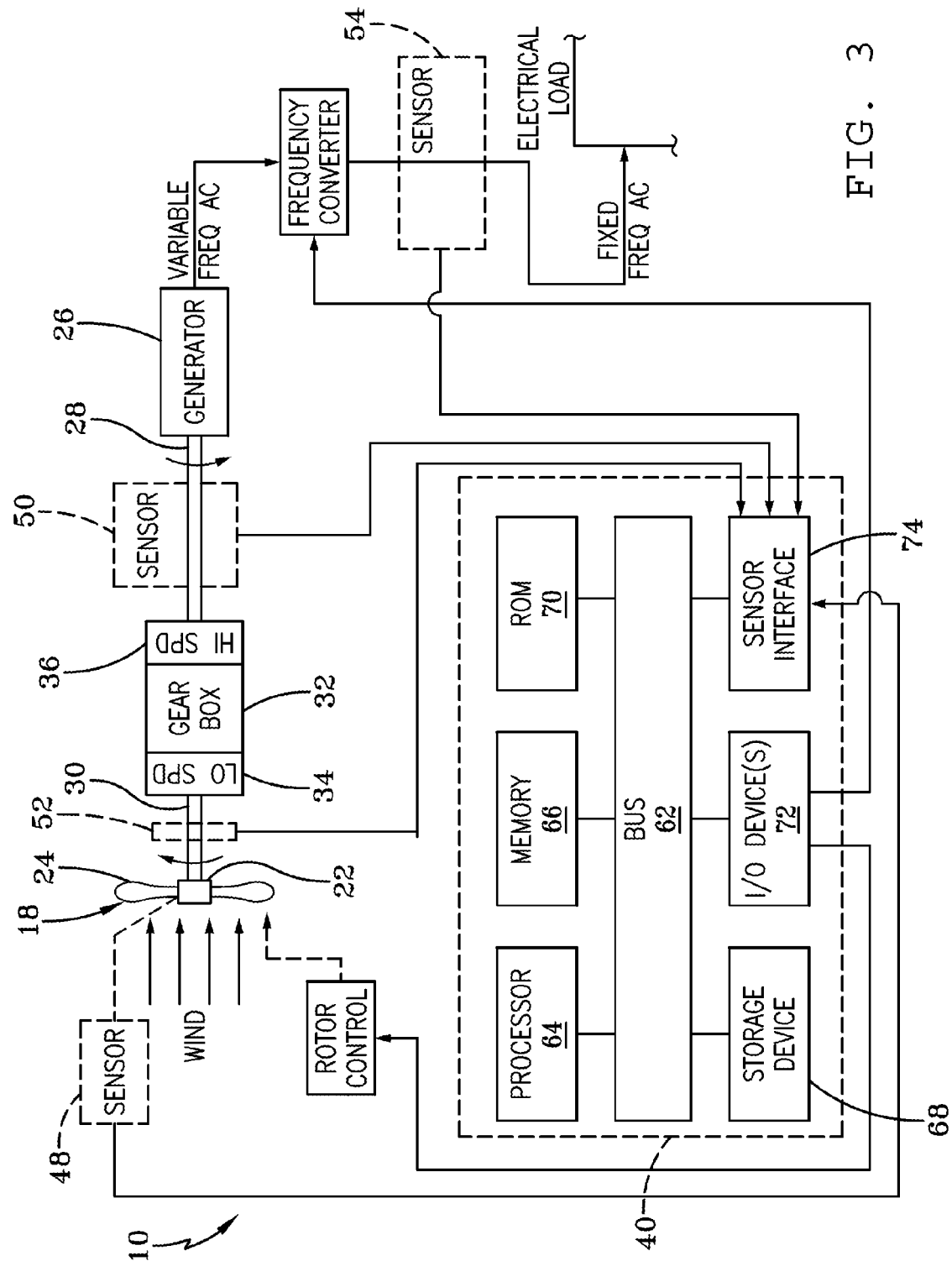
FIG. 3 illustrates a schematic view of a controller according to an embodiment of the invention.

Referring to FIG. 3, controller 40 can be provided to monitor and control operation of wind turbine system 10 and/or generator 26. Controller 40 can include a microprocessor or controller configured to receive a noise control signal. In response to receiving the noise control signal, controller 40 can control the operation of wind turbine system 10 and/or generator 26. By controlling system 10 and/or generator 26, controller 40 can maintain or adjust the operating speed or pitch of rotor blades 24, operating conditions of generator 26, and/or other system operating parameters. In one embodiment with multiple wind turbine systems 10, controller 40 may selectively enable or disable each generator 26, and may selectively maintain and/or adjust the operating speed and/or pitch of rotor blades 24.

In some embodiments, controller 40 can include a bus 62 or other communications device to communicate information. One or more processor(s) 64 can be coupled to bus 62 to process information, including information from anemometry 46, sensors 48, 50, 52, and/or 54, and/or other sensor(s). Controller 40 may also include one or more random access memories (RAM(s)) 66 and/or other storage device(s) 68. RAM(s) 66 and storage device(s) 68 are coupled to bus 62 to store and transfer information and instructions to be executed by processor(s) 64.

RAM(s) 66 (and/or also storage device(s) 68, if included) can also be used to store temporary variables or other intermediate information during execution of instructions by processor(s) 64. Controller 40 may also include one or more read only memories (ROM(s)) 70 and/or other static storage devices coupled to bus 62 to store and provide static (i.e., non-changing) information and instructions to processor(s) 64. Input/output device(s) 72 may include any device known in the art to provide input data to controller 40 and/or to provide outputs, such as, but not limited to, yaw control and/or pitch control outputs. Instructions may be provided to memory from a storage device, such as, but not limited to, a magnetic disk, a read-only memory (ROM) integrated circuit, CD-ROM, and/or DVD, via a remote connection that is either wired or wireless, providing access to one or more electronically-accessible media, etc. In some embodiments, hard-wired circuitry can be used in place of or in combination with software instructions. Thus, execution of sequences of instructions is not limited to any specific combination of hardware circuitry and software instructions, whether described and/or illustrated herein. Controller 40 may also include a sensor interface 74 that allows controller 40 to communicate with anemometry 46, sensors 48, 50, 52, and/or 54, and/or other sensor(s). Sensor interface 74 can be or can include, for example, one or more analog-to-digital converters that convert analog signals into digital signals that can be used by processor(s) 64.

Controller 40 can control wind turbine system 10 and/or generator 26 to operate at a higher, lower, or consistent speed upon controller 40 receiving the noise control signal initiating a noise control mode in response to external conditions. Controller 40 can execute a control algorithm(s) or include software to control operation of wind turbine system 10 and to determine and implement an operating configuration for wind turbine system 10 and/or generator 26. The control algorithm or software of controller 40 may determine, implement, analyze, measure, and/or control the speed of rotors 24 in order to maintain or adjust the noise generated by wind turbine system 10 in response to receiving the noise control signal. The control algorithm(s) may be computer programs or software stored in the non-volatile memory of controller 40 and may include a series of instructions executable by the microprocessor of controller 40. The control algorithm may be embodied in a computer program(s) and executed by the microprocessor, or the control algorithm may be implemented and executed using digital and/or analog hardware.

The control process to reduce or limit noise generated by wind turbine system 10 during the noise control mode may be automatically initiated from a preprogrammed instruction from a system control program and/or responsive to the detection of one or more predetermined external conditions. As used herein, the term "noise" includes a sound pressure level generated by the wind turbine or components thereof and/or the external condition(s) including, but not limited to, wind speed, pressure, temperature, humidity, or the habitation of a nearby structure or structures (for example, a residence). The noise control signal may be received based upon preprogrammed conditions such as a desire to avoid generating noise at or above the predetermined level at certain times in a 24-hour period or other period. In an exemplary embodiment, the noise control mode may be initiated in response to a user input providing the control signal. The control signal may be generated in response to the user input indicating the user's detection of noise or the user's desire to avoid generating noise at or above a preselected level or to sense an external condition like the absence of people at a nearby residence and allow higher noise levels until people come home. Additionally or alternatively, the user input can identify the preselected level to be avoided by identifying a specific decibel limit or other suitable limit. The control process may be a stand-alone process or program, or the control process may be incorporated into a larger control process or program, such as a control program focused on efficiency of the system. In an exemplary embodiment with multiple wind turbine systems 10, the control process may generate the noise control signal for each wind turbine system 10 to avoid operation of at the predetermined speed for one or more of the wind turbine systems 10.

A control program or algorithm executed by a microprocessor or controller 40 may be used to determine the level (for example, a measured decibel reading or a measured pitch) of noise generated by wind turbine system 10 and/or the level of noise of generated by external conditions. The level of noise determined may include noise generated by specific components in wind turbine system 10, for example, by measuring noise generated by blades 24. The control program may receive a variety of inputs indicating external conditions, including but not limited to, wind speed, pressure, temperature, precipitation, background noise, local road traffic noise, humidity, or the habitation of nearby structure and/or residence. such as temperature, humidity, pressure, precipitation, background noise, local highway traffic noise, and/or non-occupancy of nearby structures (for example, residences). The inputs can be used in making the determination of when to adjust or maintain the speed of wind turbine system 10, generator 26, and/or adjust other operating parameters affecting the amount of noise generated, which may thereby affect the power production.

Figure 4:
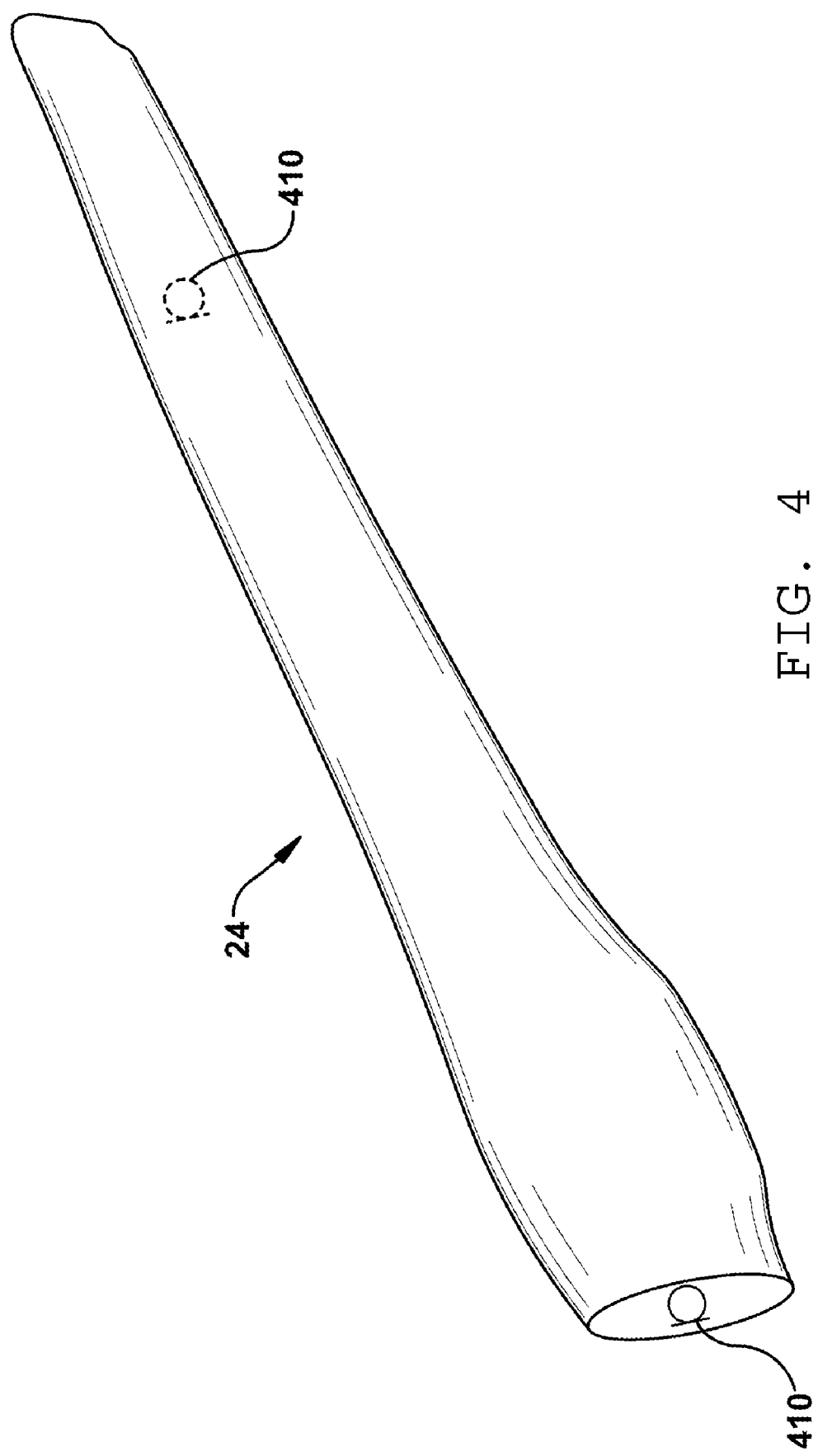
FIG. 4 illustrates a perspective view of a wind turbine blade having sensors for detecting acoustical emissions, according to an embodiment of the invention.

Referring to FIG. 4, the system, according to aspects of the present invention, may include one or more sensors 410 for detecting and measuring acoustical emissions of blades 24. The sensors can include microphones, acoustical detectors/sensors, or any other suitable device capable of detecting noises or acoustical emissions. The signals from the sensors 410 can be provided to controller 40 to control the operation of wind turbine 10. Sensors 410 may also include pressure sensors, temperature sensors, flow sensors, noise sensors, motion sensors, light sensors, vibration sensors or any other suitable type of sensor for evaluating the performance of wind turbine 10 and the operating conditions thereof. Sensors 410 may be positioned inside blade 24 and used to detect and/or measure noise at or above a predetermined level and/or frequency range (e.g., about 20 Hz to about 20,000 Hz). The sensors 410 can also be configured to monitor and detect vibrations. Sensors 410 may be in wired communication with controller 40 and/or in wireless communication with controller 40.

To detect and/or measure noise, sensors 410 may be positioned in different locations within blade 24 to discount ambient noise in determining whether noise exceeds the predetermined amount. For example, one sensor 410 may be positioned near the root or hub interface of blade 24, and a second sensor 410 may be positioned near the tip of blade 24. In addition, two or more sensors may be positioned at a variety of positions within blade 24, and one or more sensors may also be positioned within hub 22.

The signals received by sensors 410 can be used to adjust the wind turbine's operating parameters to decrease the noise level below a predetermined level. For example, the sensors 410 can communicate the received noise levels within blade 24 and/or hub 22 to controller 40. The controller 40 can analyze the noise levels and, if desired, adjust the operating parameters (e.g., pitch angle of blades 24) to reduce the noise levels.

The signals received by sensors 410 can also be used to detect damage to the blades 24 or other wind turbine components. For example, the sensors 410 can communicate the received noise levels within blade 24 and/or hub 22 to controller 40. The controller 40 can analyze the noise levels and determine if damage has occurred. For example, a change in high frequency noise may indicate a crack within blade 24. If noise within a predetermined frequency range and/or magnitude is detected, then a notification or alarm can be transmitted to a remote or local monitoring station.

In the noise control mode or damage detection mode, the operating parameters of the wind turbine may be maintained or adjusted. The operating parameters may include controlling torque of generator 26 (shown in FIG. 2) to thereby control torque of rotor shaft 30 (shown in FIG. 2), controlling an angle of pitch of one or more rotor blades 24 (shown in FIG. 1) to facilitate controlling the speed of rotor 24, controlling other operating parameters of generator 26, and/or controlling other suitable operating parameters of system 10.

Controlling generator 26 torque may include, but is not limited to, selecting generator torque, changing the generator torque, and/or controlling a rate at which the generator torque is changed. The value(s) of generator torque selected, changed, and/or controlled may be any suitable value(s) or range thereof, such as, but not limited to +/−20% of a predetermined rated torque. Generator torque may be controlled using any suitable structure, process, and/or means. In the exemplary embodiment, a frequency converter controls the torque of a coupling between generator rotor 18 and rotor shaft 30 to thereby control the torque of rotor shaft 30.

Changing the pitch angle of blades 24 may include controlling a rate at which the pitch angle of one or more blades 24 is changed. The value(s) of blade pitch angle adjusted and/or maintained may be any suitable value(s) or range thereof, such as, but not limited to, between about −5 degree and about +30 degree.

Figure 5:
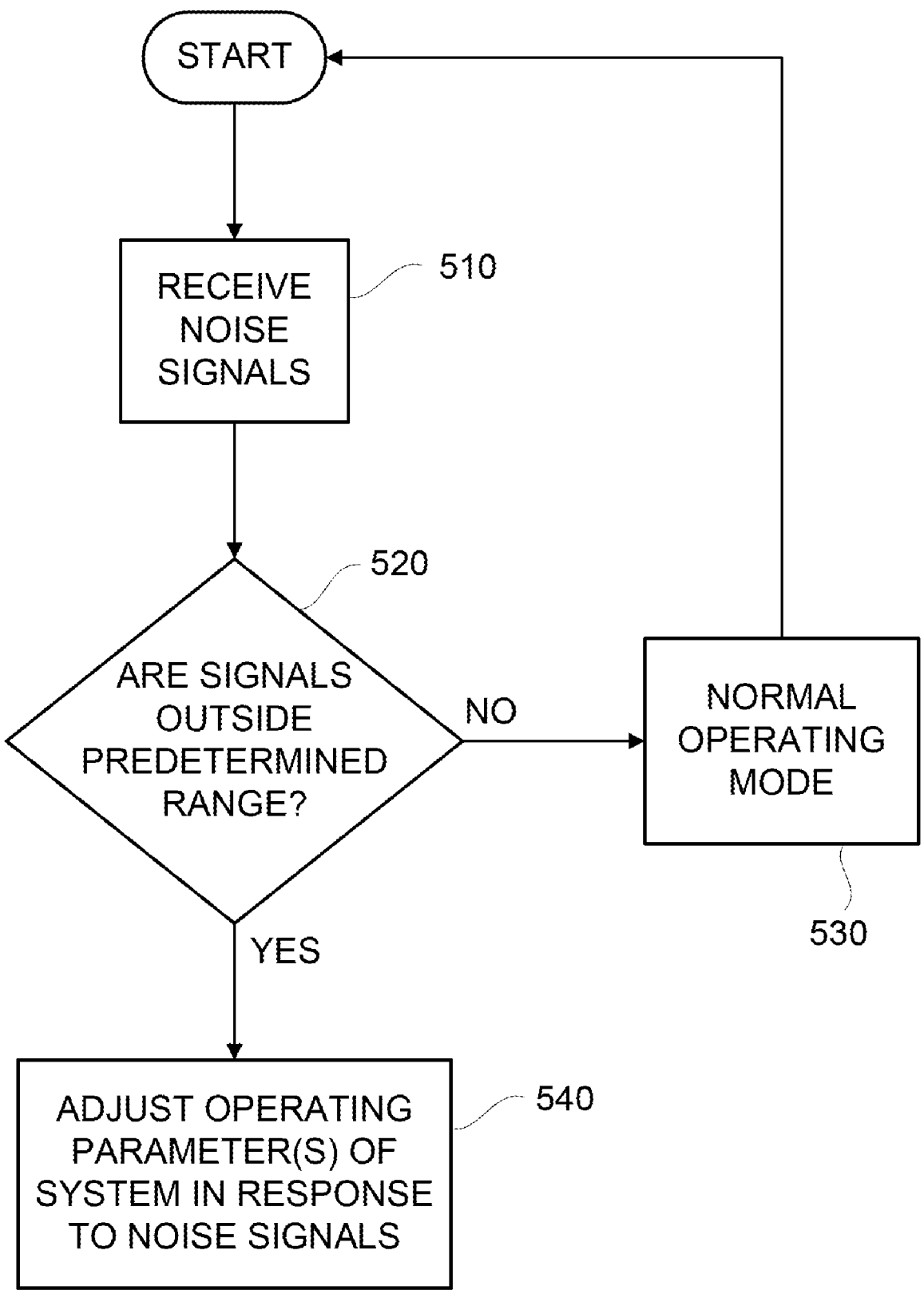
FIG. 5 is a flowchart illustrating a method according to an embodiment of the invention.

FIG. 5 shows a flow chart of an embodiment of a method to reduce noise, according to an aspect of the present invention. The process begins with receiving one or more noise signals at step 510. A determination of whether the noise signals are outside a predetermined range is performed in step 520. If not, then normal operating mode continues (step 530). If the noise signals are outside the predetermined range, then the operating parameters can be adjusted in step 540. The process next returns to the start to continue monitoring the noise signals.

Figure 6:
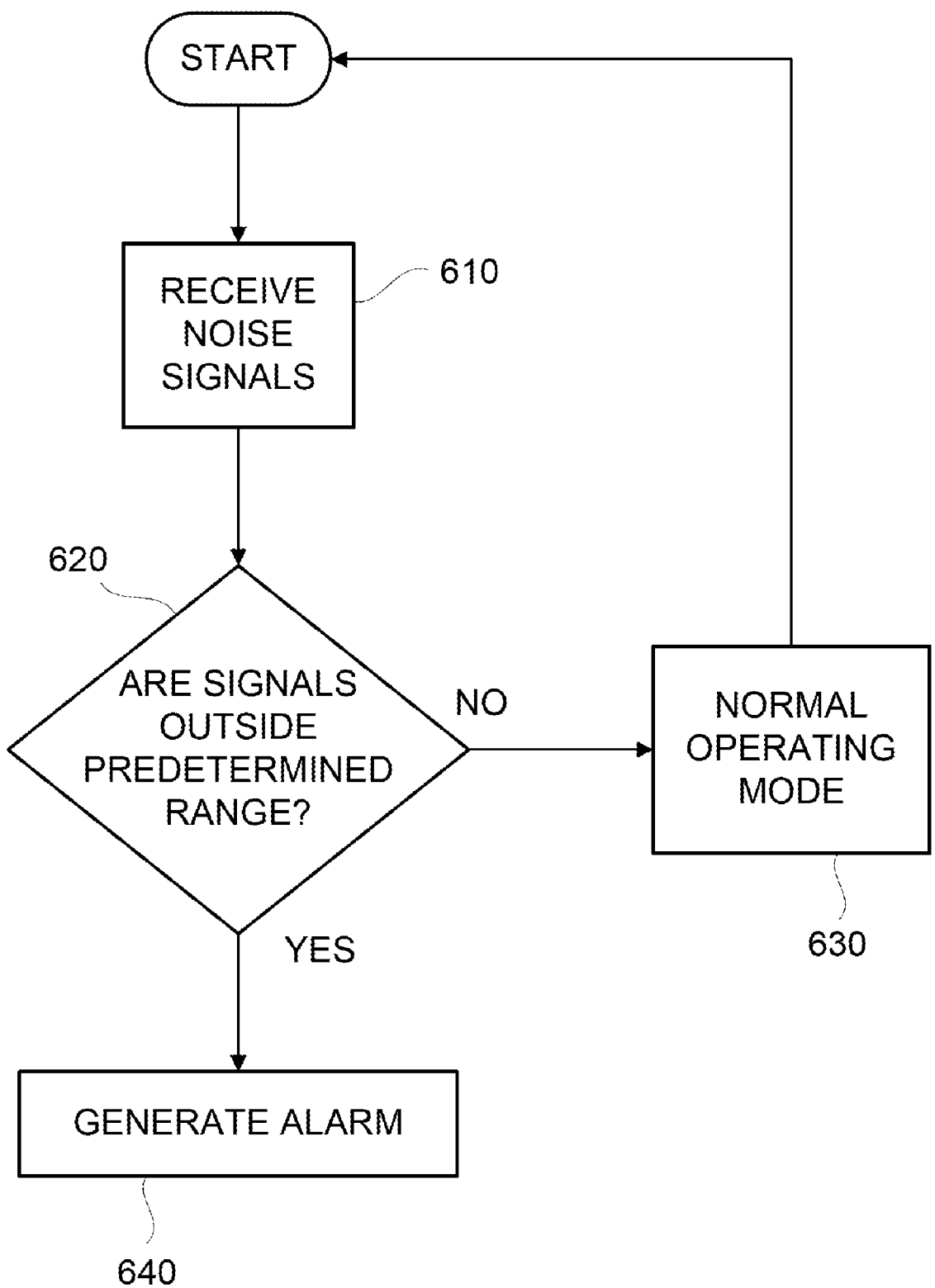
FIG. 6 is a flowchart illustrating another method according to an embodiment of the invention.

FIG. 6 shows a flow chart of an embodiment of a method to detect damage, according to an aspect of the present invention. The process begins with receiving one or more noise signals at step 610. A determination of whether the noise signals are outside a predetermined range is performed in step 620. If not, then normal operating mode continues (step 630). If the noise signals are outside the predetermined range, then an alarm can be generated in step 640. The process next returns to the start to continue monitoring the noise signals.

The noise signals can be obtained from acoustic sensors from within the blades 24 and/or hub 22. Sensors may also be placed within other parts of wind turbine 10 as well (e.g., within nacelle 16). In addition, sensors may also be placed external to the wind turbine 10. The noise signals can be adjusted to remove background noise or noises due to ambient conditions (e.g., external wind noise, etc.). The methods herein described can also look for noises within specific frequency ranges and/or above predetermined amplitudes.

The sensed noise signals can also be compared to International Electrotechnical Commission (IEC) compliant noise levels. IEC standards provide a uniform methodology for measuring the noise emissions of a wind turbine under varying wind speeds to facilitate comparison between wind turbines. The standard is often used by wind turbine manufacturers to specify noise emissions and by end-use customers to test whether specifications are met. The tests may call for measurements of sound power level, one-third-octave band levels, and tonality at various wind speeds. One equation that may be used to calculate the sound power level (SPL) [dB(A)] from the maximum tip speed ($V_{tip}$) [m/s] and rotor diameter (D) [m] is given in Equation 1. X is a correction factor and is typically between 4 and 10.

$$\text{SPL} = 50 \log_{10}(V_{tip}) + 10 \log_{10}(D) - X$$

(Equation 1)

One method, according to aspects of the present invention, can receive noise signals from acoustic sensors within the blade, and calculate blade tip speed from rotor speed. IEC compliant noise may be calculated using Equation 1 and this result can be transmitted to the wind turbine controller. Based on the result, operating characteristics of the wind turbine may be adjusted or alarms may be generated.

While the disclosure has been described with reference to one or more preferred embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method of providing noise control for a wind turbine, comprising:
   receiving one or more acoustic signals from one or more acoustical sensors within a wind turbine blade;
   determining if said one or more acoustic signals are outside a predetermined range;
   adjusting an operating parameter of the wind turbine during operation thereof in response to said receiving one or more acoustic signals from one or more acoustical sensors step if the one or more acoustic signals are outside the predetermined range;
   wherein the operating parameter is adjusted to reduce an amount of noise generated by the wind turbine.

2. The method of claim 1, wherein additional sensors are selected from the group consisting of pressure sensors, temperature sensors, flow sensors, motion sensors, and light sensors, or combinations thereof, to detect at least one of pressure, temperature, flow, motion, and light.

3. The method of claim 1, wherein the predetermined range is selected from the group consisting of a frequency range, an amplitude range, or combinations thereof.

4. The method of claim 1, wherein the operating parameter is selected from the group consisting of operating speed of the blades, torque demand, pitch angle, a rotor speed, torque, or combinations thereof.

5. The method of claim 1, wherein the one or more sensors are also located within a hub of the wind turbine.

6. A method of detecting damage to a wind turbine, comprising:
   receiving one or more acoustic signals from one or more acoustical sensors within a wind turbine blade, the one or more acoustic signals received during operation of the wind turbine;
   determining if said one or more acoustic signals are outside a predetermined range;
   generating an alarm in response to said determining if said one or more acoustic signals are outside a predetermined range step.

7. The method of claim 6, wherein additional sensors are selected from the group consisting of pressure sensors, temperature sensors, flow sensors, motion sensors, and light sensors, or combinations thereof, to detect at least one of pressure, temperature, flow, motion, and light.

8. The method of claim 6, wherein the predetermined range is selected from the group consisting of a frequency range, an amplitude range, or combinations thereof.

9. The method of claim 6, wherein the one or more acoustical sensors are also located within a hub of the wind turbine.

10. The method of claim 6, wherein the alarm is a notification that a crack has occurred in the wind turbine blade.

11. A wind turbine system for providing at least one of noise control and damage detection, comprising:
   at least one blade operably mounted on a wind turbine;
   one or more acoustical sensors attached to the wind turbine, the one or more acoustical sensors for receiving one or more acoustic signals relating to an operating characteristic of the wind turbine system during operation of the wind turbine, at least a portion of the one or more acoustical sensors located within the at least one blade;
   a controller configured for evaluating the one or more acoustic signals to determine if the one or more acoustic signals are outside a predetermined range;
   wherein if said one or more acoustic signals are outside a predetermined range the wind turbine system is configured to at least adjust an operating characteristic of the wind turbine or generate an alarm.

12. The wind turbine system of claim 11, further comprising additional sensors selected from the group consisting of pressure sensors, temperature sensors, flow sensors, motion sensors, light sensors, or combinations thereof, to detect at least one of pressure, temperature, flow, motion, and light.

13. The wind turbine system of claim 11, wherein the one or more acoustical sensors are located within at least one of a blade and a hub of the wind turbine system.

14. The wind turbine system of claim 11, wherein the predetermined range is selected from the group consisting of a frequency range, an amplitude range, or combinations thereof.

15. The wind turbine system of claim 11, wherein the operating parameter is selected from the group consisting of operating speed of the blades, torque demand, pitch angle, a rotor speed, torque, or combinations thereof.

16. The wind turbine system of 11, wherein the alarm is a notification that a crack has occurred in a blade of the wind turbine system.

* * * * *